US007243308B2

(12) United States Patent
Lamb et al.

(10) Patent No.: US 7,243,308 B2
(45) Date of Patent: Jul. 10, 2007

(54) SYSTEM AND METHOD FOR DYNAMICALLY ADJUSTING DATA VALUES AND ENFORCING VALID COMBINATIONS OF THE DATA IN RESPONSE TO REMOTE USER INPUT

(75) Inventors: Steven D. Lamb, Woodinville, WA (US); Adam M. Feldstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 10/952,578

(22) Filed: Sep. 27, 2004

(65) Prior Publication Data

US 2005/0050473 A1 Mar. 3, 2005

Related U.S. Application Data

(63) Continuation of application No. 09/157,018, filed on Sep. 18, 1998, now Pat. No. 6,803,926.

(51) Int. Cl.
*G06F 3/00* (2006.01)
*G06Q 20/00* (2006.01)

(52) U.S. Cl. .................... 715/744; 715/746; 715/700; 715/962; 705/20

(58) Field of Classification Search ............. 715/749, 715/744, 748, 760, 825, 962
See application file for complete search history.

(56) References Cited

U.S. PATENT DOCUMENTS 5,832,452 A * 11/1998 Schneider et al. ............ 705/5
5,844,554 A * 12/1998 Geller et al. ............... 715/744
5,870,719 A * 2/1999 Maritzen et al. ............. 705/26
5,918,217 A * 6/1999 Maggioncalda et al. .. 705/36 R
5,926,817 A * 7/1999 Christeson et al. .......... 707/10
6,021,426 A * 2/2000 Douglis et al. ............. 709/200
6,055,514 A * 4/2000 Wren ...................... 705/36 R
6,167,383 A * 12/2000 Henson ...................... 705/26
6,175,832 B1 * 1/2001 Luzzi et al. ................. 707/10
6,233,620 B1 * 5/2001 Gish ......................... 709/203
6,535,229 B1 * 3/2003 Kraft ......................... 715/764
6,654,726 B1 * 11/2003 Hanzek ...................... 705/26

* cited by examiner

*Primary Examiner*—Sy D. Luu
(74) *Attorney, Agent, or Firm*—Lyon & Harr, L.L.P.; Craig S. Fischer

(57) ABSTRACT

The present invention is embodied in a system and method for dynamically adjusting data values and preventing conflicts in response to remote user input. Namely, the system and method provides a remote user with real time interaction of data values, such as a set of results, associated sub-items or dependencies, and rules of enforcement of sub-item combinations produced by a host system. Adjustment of conflicting sub-items is prevented with the rules of enforcement and predefined interactive options. As such, the user can dynamically adjust the set of results and sub-items from a remote location. The system and method of the present invention preferably utilizes client-side processing to achieve real time interaction.

25 Claims, 8 Drawing Sheets

SYSTEM AND METHOD FOR DYNAMICALLY ADJUSTING DATA VALUES AND ENFORCING VALID COMBINATIONS OF THE DATA IN RESPONSE TO REMOTE USER INPUT

BACKGROUND OF THE INVENTION

1. Field of the Invention

The present invention relates to a system and method for processing data, and in particular, to a system and method for adjusting data values and enforcing valid combinations of the data in real time in response to remote user input.

2. Related Art

Quick and easy interaction between a server and a client user is desirable, especially for systems with bandwidth limitations. For example, the Internet utilizes a server-client system. Many client users with Internet access have bandwidth limitations. For example, during interaction with the World Wide Web, these client users typically encounter server processing every time the user makes a request. Constant server processing bogs down the server, delays user Internet navigation and creates an unpleasantly Typical server-client systems utilize servers that provide remote users access to database information stored on the server. For instance, in many systems, first, a user requests information based on user defined criteria. Second, the server collects available information relating to the user defined request, such as associated sub-items. Third, the server transmits the associated sub-items to the client and displays the sub-items on the client. Fourth, the user builds a sub-item configuration by making sub-item selections and submitting the selections. Fifth, if the selections are invalid, the server notifies the user that the selections are invalid and the process starts over from the third step. This validation step is repeated until the remote user submits a valid sub-item configuration and sub-item selections without conflicts. When the selections are valid, the server collects results based on the sub-item selections and sub-item configuration. Sixth, the results built from the sub-item selections are transmitted to the client. Last, if the results are not desired by the user or if the sub-item selections require adjustment, the process must be repeated starting from the third step.

One such system is a server database with a used car price guide for access by a remote user. First, the remote user makes an initial request to access results, such as pricing information for a particular car. After the remote user makes the initial request, the server collects sub-items, such as options relating to the particular car, and transmits the options to the remote user. The remote user is then required to select options for building an option configuration. If the option selections are invalid or conflict, the server notifies the user that the selections are invalid and then retransmits the options to the user. This validation step is repeated until the remote user submits valid option selections and an option configuration without conflicts. When the selection is valid, the server collects pricing information based on the option selections and overall configuration. The pricing information built from the selected options is then transmitted to the remote user.

However, if the user desires to modify, adjust, limit, etc. the options, the process must be repeated starting from the third step and the server must be re-accessed. In addition, conflicts between options that are unknown to the remote user can cause the server to be unnecessarily re-accessed numerous times. This is because attempts to adjust options that conflict will produce an error and the user will be given the options again and be required to submit new options for re-accessing the server until there are no conflicts. As a result, the user is required to navigate sometimes through several layers of information. Hence, these systems are slow, do not allow real time user interaction and require undue processing. Therefore, what is needed is an effective and efficient technique for adjusting data values, preventing conflicts and enforcing valid sub-item combinations in real time in response to remote user input. What is also needed is a system and method that utilizes client-side processing instead of server-side processing for data processing to avoid lengthy server reloading.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for dynamically adjusting data values and preventing conflicts in response to remote user input. Namely, the system and method provides the remote user with real time interaction of data values, such as a set of results and sub-items, produced by a host system. The user can dynamically adjust the set of results by changing sub-item selections from a remote location. In addition, sub-item conflicts are prevented with transmitted rules for enforcement of sub-item combinations and predefined interactive options. The system and method of the present invention preferably utilizes client-side processing to achieve real time interaction.

Specifically, first, a user requests information from a remote computer and then results of the requested information are collected at a host computer. Second, the results, sub-items and rules of enforcement of the sub-items relating to the request are transmitted from the host to the remote computer in a format that is preferably encoded and transparent to the remote user. Third, the results are remotely processed in response to user interaction of the results and sub-item selection and configuration. The processed results are dynamically adjusted and displayed as the user interacts with the results and the sub-items. Sub-item conflicts are prevented by enforcement of the transmitted rules of sub-item combinations and predefined interactive options. Graphical user interface control devices are used to allow user interaction and adjustment of the results. For example, alphanumerical boxes, drop-down menus, check boxes, radio buttons or the like can be used. The system and method of the present invention preferably utilizes client side-processing of the results instead of server-side processing. This enables the user to quickly access and adjust information dynamically and in real time without server delays.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Quick and easy interactive computer environments are very desirable, especially for remote users. The present invention provides this type of interactive computer environment for remote users by allowing the remote user to interact with data values for dynamically adjusting the data values. Namely, the system and method of the present invention allows the remote user to adjust a set of results produced by a host system in real time. Preferably, the system and method of the present invention achieves real time interaction by utilizing client-side processing for providing dynamic interaction of the set of results by a user from a remote location.

Exemplary Operating Environment

Figure 1:
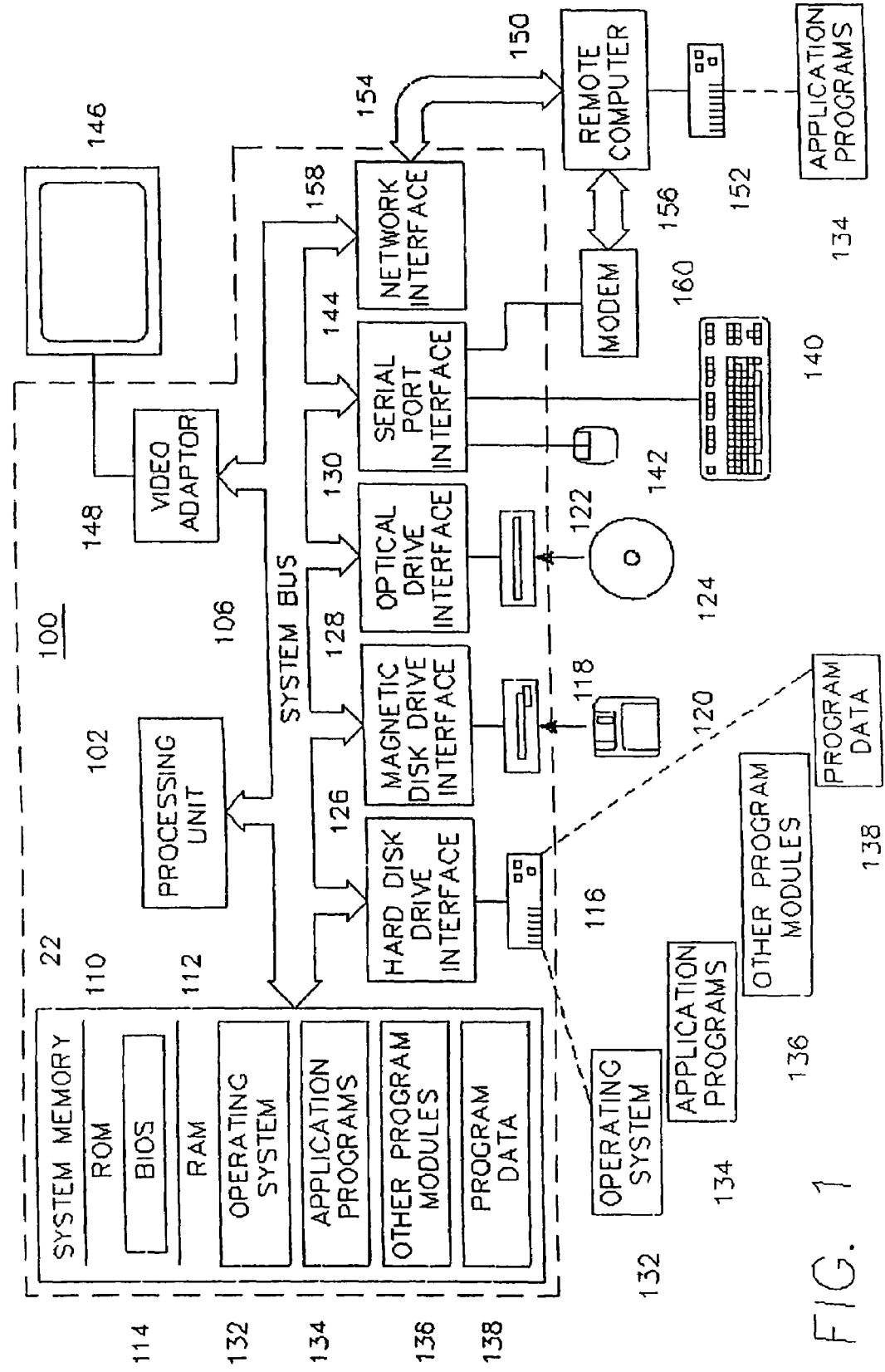
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

Figure 2:
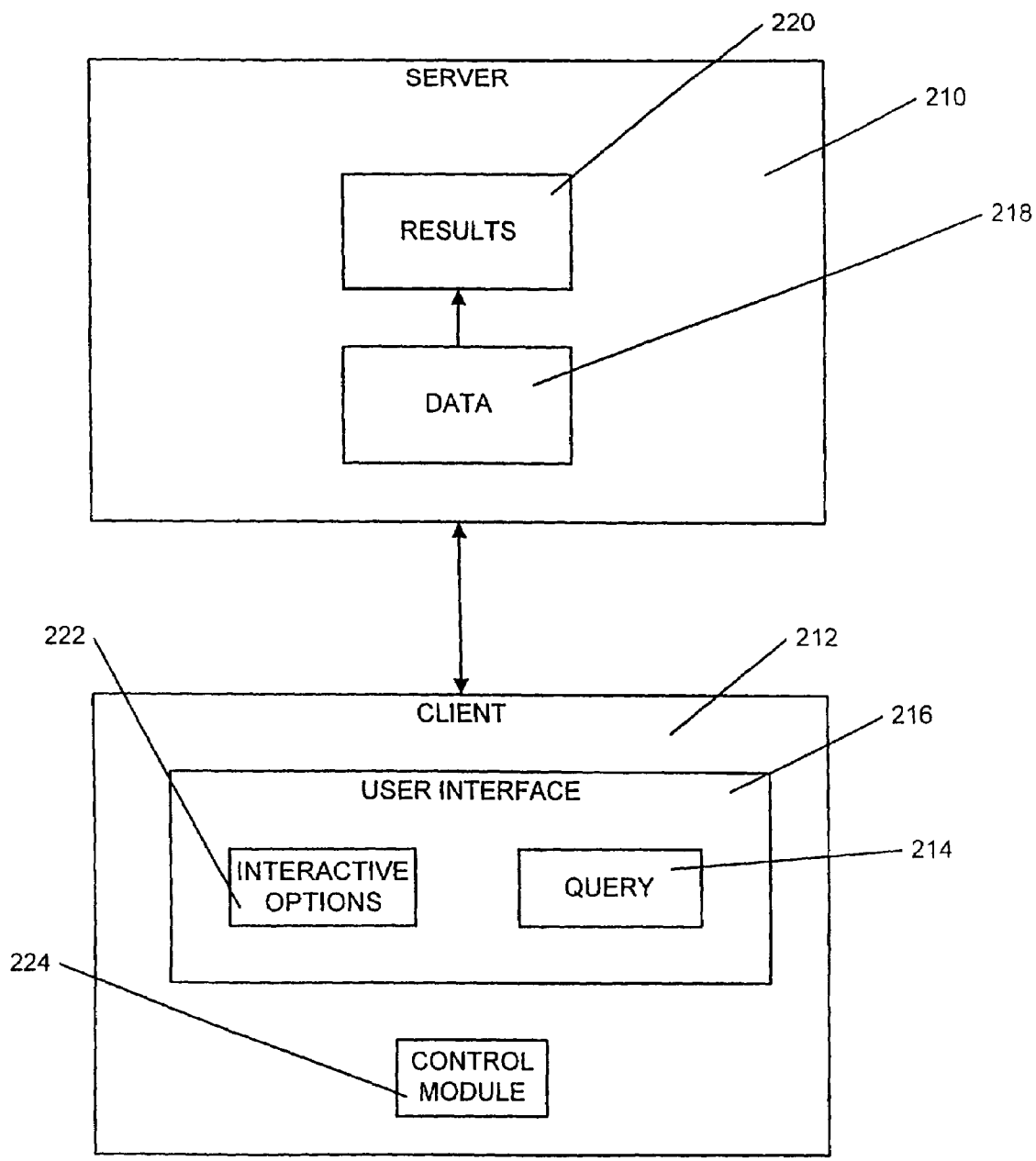
FIG. 2 is a block diagram illustrating an overview of the present invention.

Components and Operation:

FIG. 2 is a block diagram illustrating an overview of the present invention. The present invention is embodied in a system for adjusting data values in real time in response to remote user interaction with the data values. The system includes a host unit or server 210 coupled to at least one remote unit or client 212. In response to an initial client query 214 by a user th rough a user interface (UI) 216, such as a graphical user interface (GUI), data 218 stored on the server 210 is accessed, preferably as sorted data, to produce results 220 comprised of data values. The results, sub-items, rules of enforcement of sub-item combinations and possible final results 220 are preferably sent in a single transmission to the client 212. The user interface 216 can display the results, the sub-items and the possible final results as data values. The user at the client 212 is provided with interactive options 222 related to the data values, which allows the user to interact with the data values and make adjustments to the data values with user input directed to the interactive options 222. Alternatively, a control module 224, which can be sent from the server to the client or created dynamically on the client 212, can be located on the client 212 during user interaction with the data values. The control module 224 controls the transmitted results and processes the user input for providing dynamic adjustment of the data values and real time user interactivity.

Figure 3:
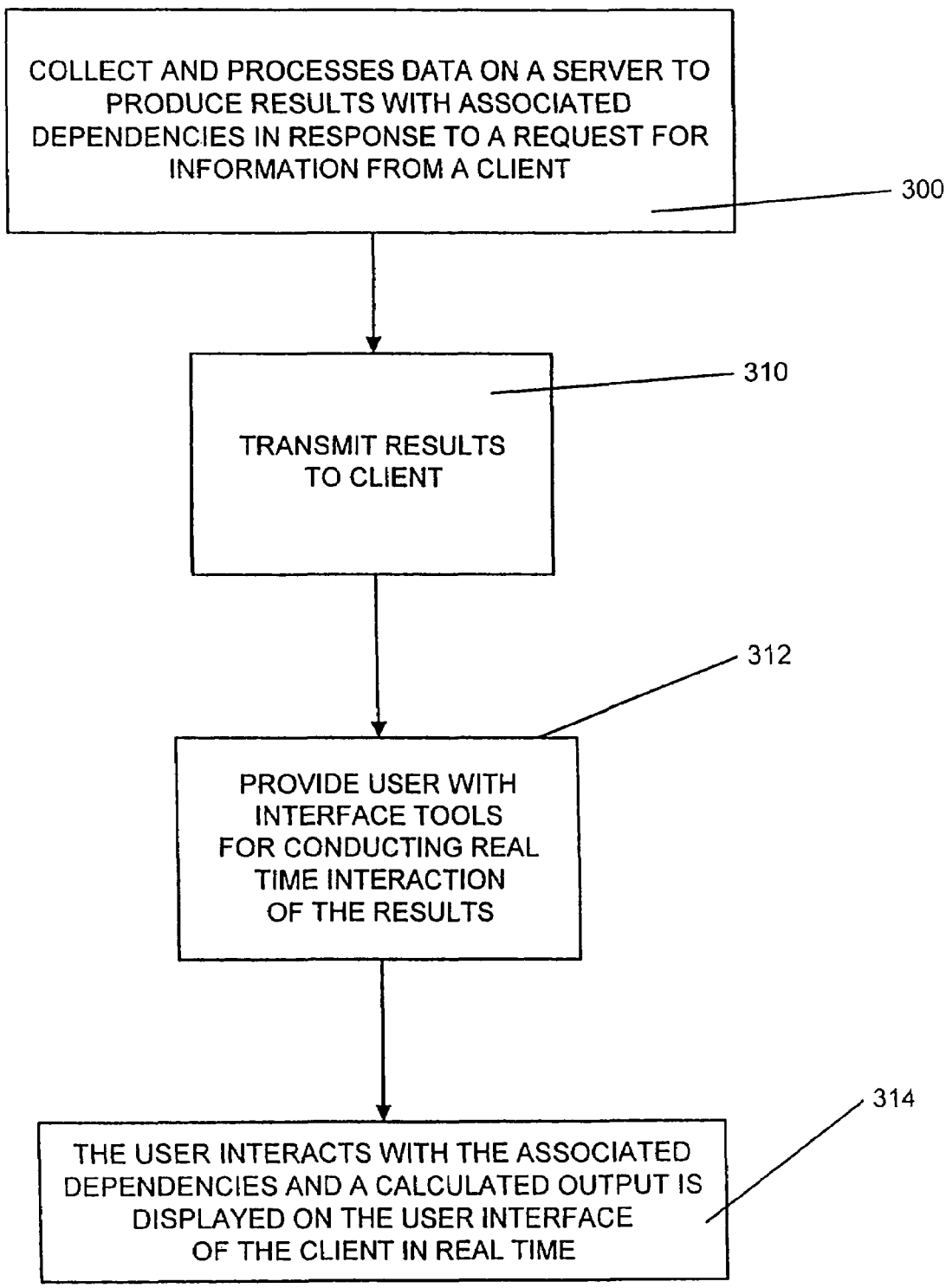
FIG. 3 is a flow diagram illustrating the general operational flow of the present invention.

FIG. 3 is a flow diagram illustrating the general operational flow of the present invention. Specifically, a host computer or server collects and processes data to produce results with associated sub-items or dependencies in response to a request for information from a remote computer or client (step 300). The results and associated sub-items or dependencies of the request are transmitted, preferably in an encoded format that is hidden from and transparent to the user, to the client from the server (step 310). The user is provided real time interactivity of the results and associated dependencies with user input through interactive user interface tools (step 312), such as graphical user interface tools.

Adjustments of the results and associated sub-items or dependencies by the user are displayed on the user interface of the client in real time (step 314). The user input is preferably processed at the client to allow the real time interactivity in the form of adjustment, filtering and viewing of the results. FIGS. 2 and 3 refer to one server and one client for illustrative purposes only. It should be noted that the server referred to in FIGS. 2 and 3 can be one or more servers coupled to numerous respective clients and can communicate simultaneously with the clients in the manner described in FIGS. 2 and 3.

Figure 4:
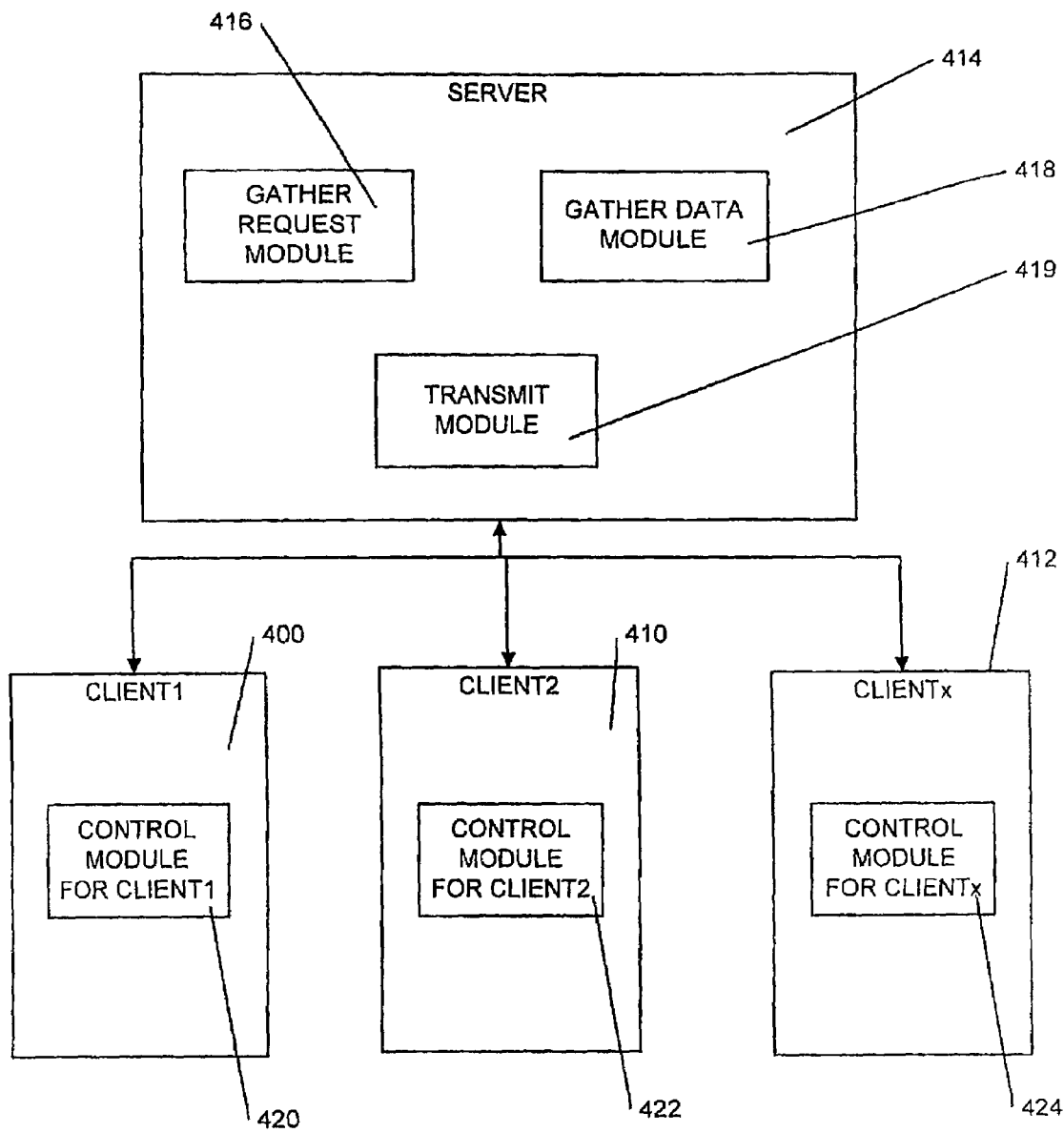
FIG. 4 is a block diagram illustrating a processing method in accordance with the present invention.

FIG. 4 is a block diagram illustrating a processing method in accordance with the present invention. In one embodiment, the present invention utilizes client-side processing. Client-side processing involves performing data adjustment in response to user input on the client instead of on the server. Client-side processing provides a remote user with real time interactivity and dynamic data adjustment, unlike server-side processing, which forces the remote user to access the server every time the remote user adjusts the data.

For example, as shown in FIG. 4, client$_1$ 400 makes request$_1$ ($R_1$), client$_2$ 410 makes request$_2$ ($R_2$) and client$_x$ 412 makes request$_x$ ($R_x$). A server 414 utilizes a gather request module 416 that gathers and sorts respective the results for each respective request. A gather data module 418 gathers respective results, sub-items (dependencies) and sub-item rules of enforcement. The results can be gathered as raw data or as encoded data, such as pre-compressed data packets associated with their respective raw data results. A transmit module 419 transmits the raw data or the encoded data, sub-items and rules of enforcement of sub-item combinations ($CM_1$, $CM_2$, $CM_3$) for each set of raw data or encoded data, and a decompressor, if encoded data is transmitted. This information is sent to respective clients (Client$_1$, Client$_2$, Client$_3$) in a format that is preferably transparent to respective users of the clients 400, 410, 412.

Alternatively, an active control module can be transmitted with the results. Transmitted control modules 420, 422, 424 reside on each client and can, among other things, decode any encoded data transmitted to reproduce the raw data results for each client. Each control module 420, 422, 424 also displays the respective raw data results for each respective client 400, 410, 412.

In addition, each user is provided with interactive options for adjusting the raw data results. For example, graphical user interface controls, such as graphical gauges, can be provided. The gauges can include drop-down menus, alpha-numerical input boxes, check boxes, radio buttons, sliders or the like. Since each control module resides on the client, they are able to process and display adjustments made by each user in real time, thereby providing a dynamic interactive environment.

The gather request module 416 and the gather data module 418 can utilize any suitable data retrieval technique, such as structured query language (SQL) techniques to process the request and gather the data. The control module can be any suitable module for controlling operations and performing functions, such as an ActiveX control, Java applet, Perl applet, JavaScript, JScript, etc. Also, the control module can utilize any suitable data structure for organizing and adjusting the data in real time. For example, an array, stack and queue, linked list, decision tree, etc. can be used. In addition, the interactive options can be user friendly user interface devices, such as drop-down menus, alphanumerical input boxes, check boxes, radio buttons, sliders, etc. for adjusting the raw data results.

WORKING EXAMPLE

Figure 5:
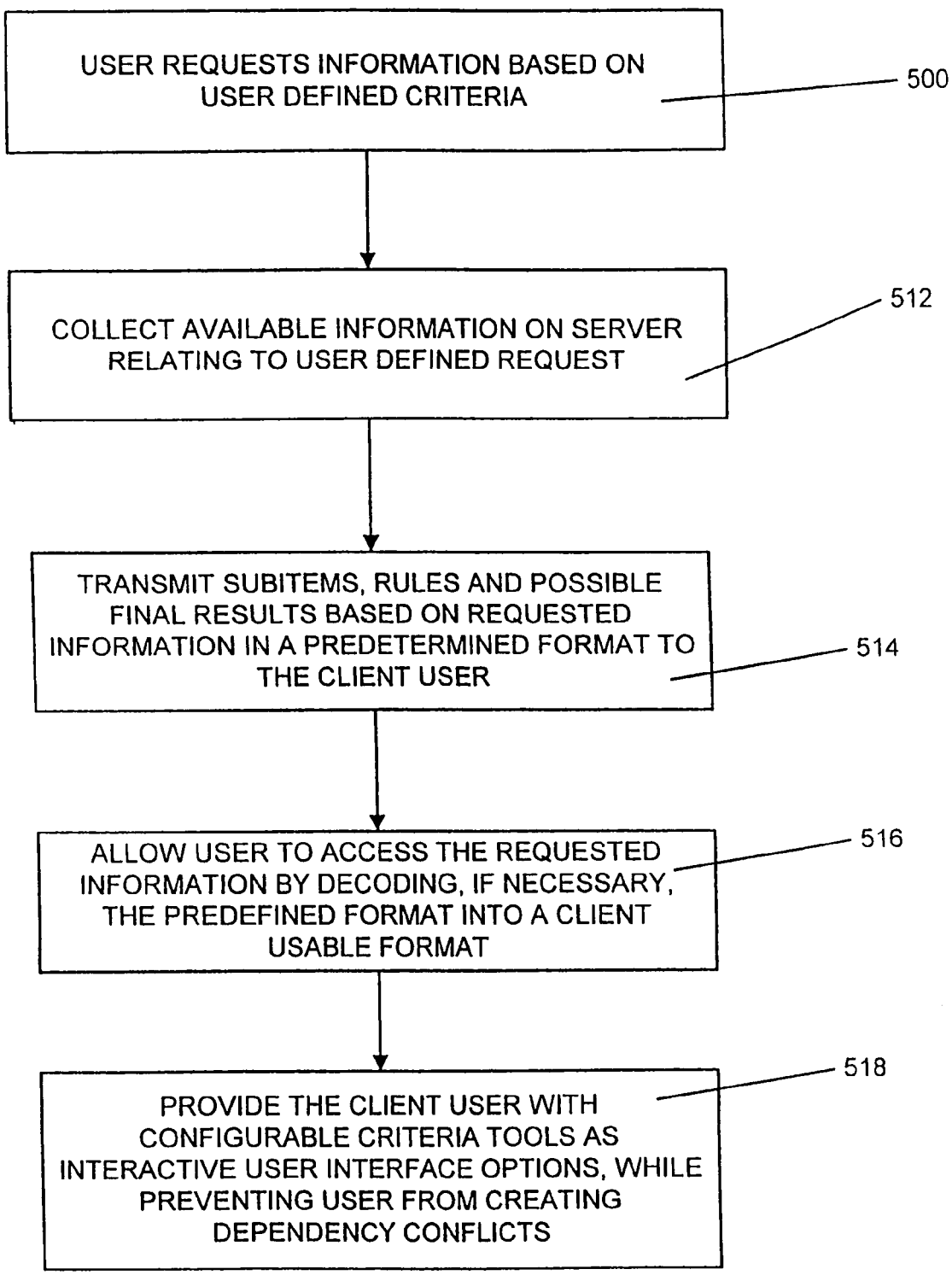
FIG. 5 is a flow diagram illustrating a working example of the system and method of the present invention.

FIG. 5 is a flow diagram illustrating a working example of the system and method of the present invention. FIGS. 6-10 are sample user interfaces of the working example of FIG. 5 of the system and method of the present invention. As discussed above, any suitable control component and client-side processing technique can be used. FIG. 5 is for illustrative purpose only and shows a working example utilizing a control, such as a script or a batch file utilizing JavaScript. The script or batch file can be written in any suitable scripting language, such as C++, Java, Visual Basic. The control component allows user manipulation of the results with graphical user interface development tools.

Specifically, as shown in FIG. 5, first, the remote user requests information based on user defined criteria (box 500). The user defined criteria narrows the data results. For example, the user can request pricing information for used cars based on manufacturer, model, year, geographical location, trim, etc. As such, the user defined criteria enables production of limited and targeted results, such as results for a particular car manufacturer, model and year, instead of all the cars made for a particular manufacturer. The user defined criteria can be obtained from the user in any suitable manner, such as the user interface of FIGS. 6-10. Next, the server collects the requested information relating to the user's defined request that is stored on the server (box 512).

Figure 6:
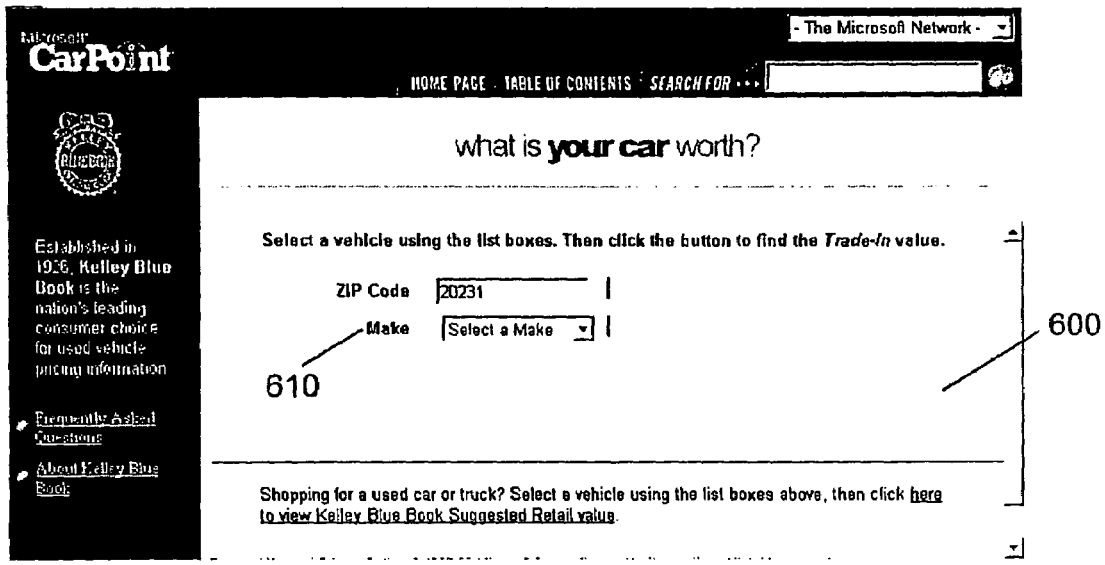
FIGS. 6-10 are sample user interfaces of the working example of FIG. 5 of the system and method of the present invention.
Figure 7:
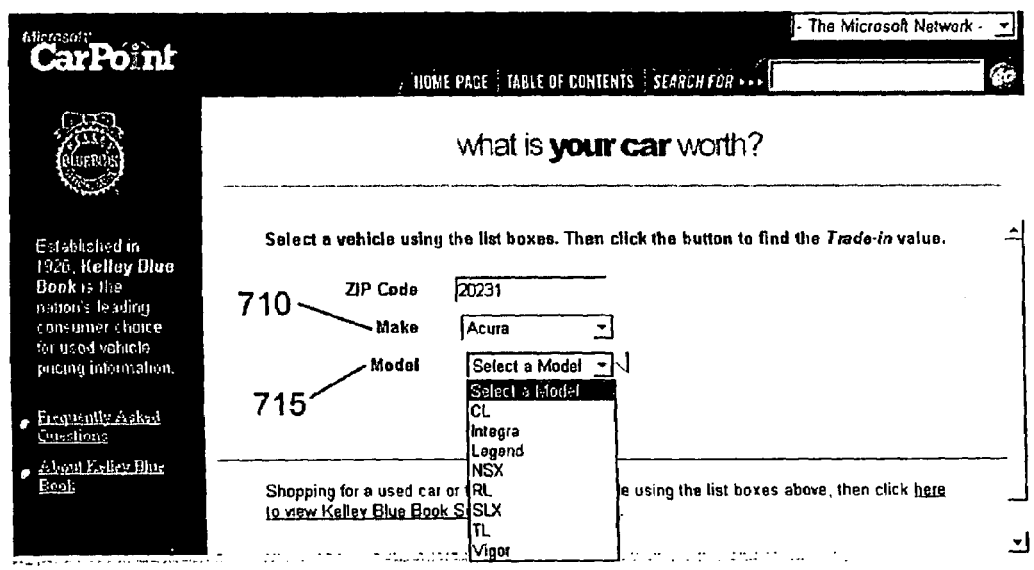
Figure 8:

In one embodiment, such as an HTML user interface, the user is provided with an initial request and then subsequent related sub-requests, without changing screens or requiring navigation through different pages, as shown in FIGS. 6-8. Each subsequent sub-request is directly associated with responses from the user to previous sub-requests. Subsequent sub-requests are dynamically configured as the user responds to previous sub-requests. For example, as shown in FIG. 6, for a specific used car price inquiry, the user is initially requested to select a first subset of data (such as a particular car make 610), from a general set of data (such as the set of all cars makes), from a user interface 600. The user interface can have any suitable interface tool such as a drop-down menu for presenting and accepting user input.

Based on the user's selection of the initial request, a new sub-request containing a second subset of data of the first subset is dynamically configured and displayed on the user interface without requiring navigation through different pages. In the example of FIGS. 6-8, the second subset of data contains limited information for the particular car make 610 chosen as the first subset. For instance, only several car models 715 are available for the particular car make 710 chosen. The available car models 715 are configured and displayed dynamically as the user submits the (car make 710) response to the first request.

Similarly, based on the user's selection of the sub-request, a new sub-request containing a third subset of data of the second subset is dynamically configured and displayed on the user interface without requiring navigation through different pages. For instance, from the first subset of data (car make 810) and the second subset of data (car model 815), limited data is available for configuration and display as the third subset of data (years of car 818). This process progressively narrows and refines the data and associated dependencies and can be used with numerous subsequent sub-requests containing associated subsets of data of previous sub-requests, as shown in FIGS. 6-8.

Figure 9:
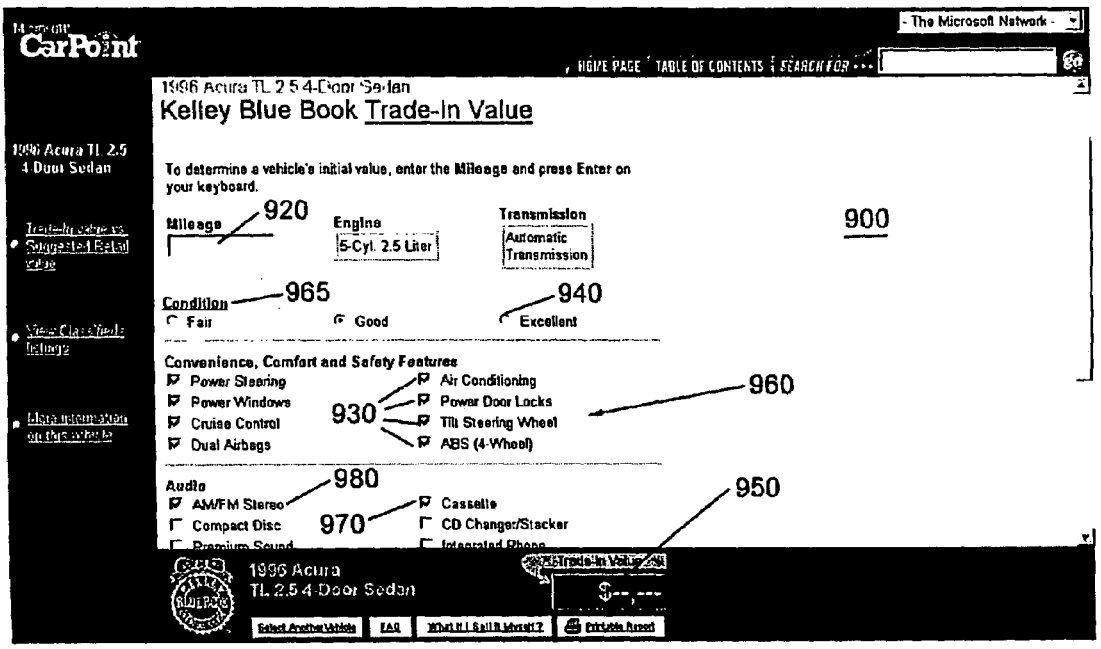
Figure 10:
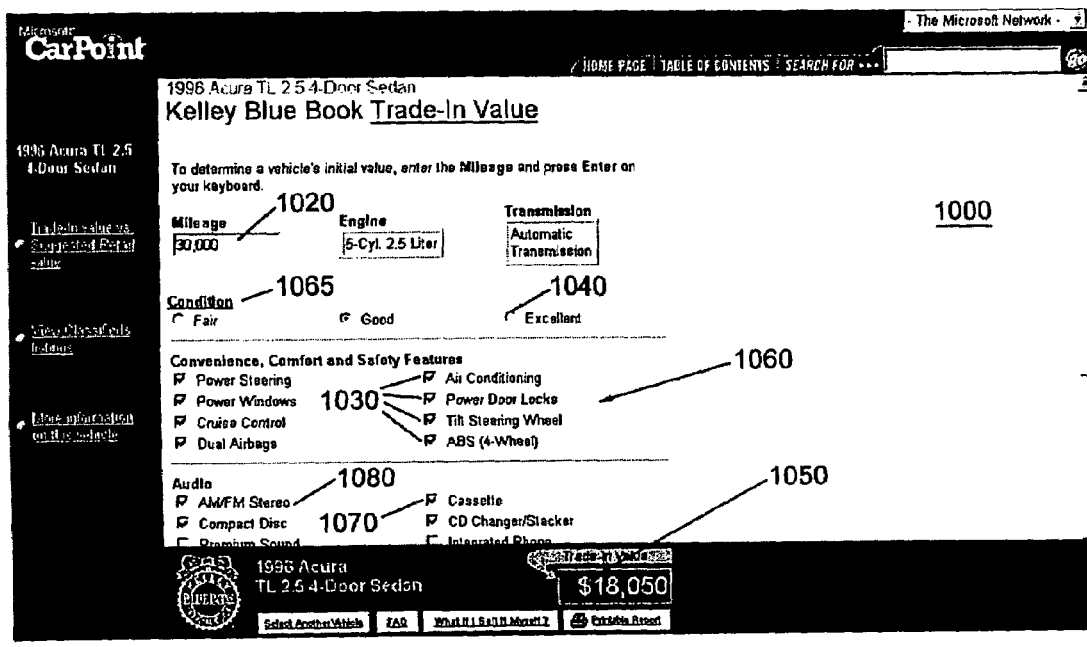

The server can encode and compress the data associated with the refined results dynamically or have the associated data available as stored accessible raw results with corresponding pre-compressed data or pre-encoded data representing the results. The results, associated sub-items or dependencies, rules of enforcement of sub-item combinations and possible final results are transmitted to the client preferably as encoded pre-compressed data and in a format that is transparent to the client user (box 514). The data representing the results, the sub-items, corresponding rules of enforcement, and the possible final results are provided to the client in a usable format by decoding the data, if necessary (box 516). The results and associated sub-items (dependencies) are displayed on the user interface 900, 1000 of the client in a user readable format as shown in FIGS. 9-10 respectively. The results and the associated sub-items can be displayed in any suitable manner.

Last, the client user is provided with real time interactivity of the results and associated sub-items through interactive user interface tools, such as graphical user interface tools, while preventing the user from creating sub-item or dependency conflicts (box 518). The transmitted rules of enforcement of sub-item combinations contain all potential configurable conflicts between sub-items to thereby prevent the user from creating any sub-item conflicts during adjustment of the sub-items. The interface tools can include configurable input boxes that can accept alphanumerical input or the like, drop-down menus, check boxes, radio buttons or any suitable interface, such as graphical gauges that allow a user to move graphics within a reference datum for adjusting the criteria for associated fields in real time (box 518).

Specifically, as shown in FIGS. 9 and 10, the user interface 900, 1000 includes input boxes 920, 1020, check boxes 930, 1030 and radio buttons 940, 1040 for adjusting the results and associated sub-items. A dynamic output display 950 is initialized, such as setting up default values before any interface tool is adjusted, as shown in FIG. 9. As the client user adjusts the interface tools 920, 930, 940, the effect on the overall results of different sub-item configurations and combinations are calculated on the client while the transmitted rules of enforcement prevent sub-item conflicts, as shown in FIG. 10. For example, as mileage is placed in the input box 1020 or as certain sub-items (car options) are selected, the price of the dynamic output box 1050 is calculated, changed and displayed in real time while the rules of enforcement prevent the user from configuring predefined conflicting options. Alternatively, a control module can calculate, change and display information in the dynamic output box 1050 in real time in response to the adjustments. Therefore, as the user adjusts the interface tools with the graphical tools, the client dynamically displays new data affected by the adjustments.

In addition, the refined data can contain predefined known conflicts of the associated sub-items and corresponding safeguards to prevent the user from encountering a conflict. This can be accomplished by initializing the displayed results and sub-items by setting up default values before any interface tool can be adjusted by the user. For example, for each subset of data, since all rules of enforcement of sub-item combinations are transmitted to the client, all potential conflicts between sub-items can be automatically noted and prevented from being encountered by the client user. Namely, all sub-items 960 of a particular car make, model and year that are known to be standard with that particular configuration are pre-selected by default, as shown by the selected check boxes 960, 1060 of FIG. 9. In addition, only sub-items that are applicable to a particular car make, model and year are displayed with the results.

With regard to conflicting sub-items, radio buttons 940, 1040 can be used for mutually exclusive sub-items, such as condition 965, 1065 of the car. Also, the results can be dynamically configured. Specifically, if a particular sub-item 970, 1070 requires another sub-item 980, 1080 as a prerequisite, the prerequisite sub-item 980, 1080 will automatically be selected when the client user selects the particular sub-item 970, 1070. As a result, all conflicts are resolved dynamically by not offering sub-items that are not related to the requested data and by automatically selecting other sub-items as a particular conflicting sub-item is selected by a client user, for example, by automatically placing a check in conflicting check boxes.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for displaying data values on a client computing device, comprising:
   transmitting an information request based on user-defined criteria from the client computing device;
   receiving transmitted results, sub-items associated with the results, and rules of enforcement of sub-item combinations in response to the information request;
   displaying a first set of results on the client computing device;
   processing the first set of results in real time using the client computing device in response to a user adjustment of the first set of results to obtain processed results;
   preventing a user from creating and encountering sub-item conflicts by automatically correcting any sub-item conflicts made during the user adjustment using the transmitted rules of enforcement; and
   displaying the processed results on the client computing device.

2. The method of claim 1 further comprising providing a graphical user interface on the client computing device for allowing the user adjustment.

3. The method of claim 2 wherein the graphical user interface has at least one graphical control for allowing the user to dynamically adjust displayed data and sub-items.

4. The method of claim 1 wherein the data values comprise pricing data for at least one object, and the associated sub-items comprise user selectable options for the object.

5. The method of claim 1 wherein automatically correcting any sub-item conflicts further comprises automatically deselecting at least one of a previously selected sub-items when the user adjustment includes selecting a new sub-item which conflicts with the at least one previously selected sub-items.

6. The method of claim 1 further comprising automatically selecting at least one of an additional sub-items when during the user adjustment a user selects a sub-item which requires selection of the at least one additional sub-items.

7. The method of claim 1 further comprising processing the rules of enforcement for sub-item combinations in the background.

8. The method of claim 1 wherein processing of the first set of results further comprises processing the first set of results and the user adjustment on the client computing device after a communications interface between a server and the client has been terminated.

9. The method of claim 1, further comprising:
   receiving a transmitted control module; and
   using the control module to process the first set of results in real time.

10. The method of claim 9, wherein the control module has a graphical user interface for allowing the user to interact with and provide the user adjustment to the first set of results on the client computing device.

11. The method of claim 9, wherein the first set of results comprise pricing data for at least one object, and the associated sub-items comprise user-selectable options for the objects.

12. The method of claim 9, further comprising using the control module to automatically display a warning message when a user selects a sub-item during the user adjustment which conflicts with at least one of the sub-items already selected by the user such that the user is informed that the sub-item conflict has been automatically corrected.

13. The method of claim 9, further comprising using the control module to automatically deselect a previously selected sub-item when a user selects a sub-item during the user adjustment that conflicts with the previously selected sub-item.

14. The method of claim 9, further comprising using the control module to automatically display a message on the client computing device prompting a user to select between conflicting sub-items when the user selects a sub-item during the user adjustment that conflicts with a previously selected sub-item.

15. The method of claim 9, wherein the control module is capable of remotely processing the first set of results and associated sub-items in response to the user adjustment of the first set of results and sub-items after a communications interface between a server and the client has been terminated.

16. The method of claim 15, wherein the communications interface is the Internet.

17. A display device having rendered thereon dynamically changing results of a database query, comprising:
   a set of results, criteria associated with the set of results, and rules of enforcement of the criteria being stored as data on a server, wherein the data is transmitted from the server to a remote client after the remote client makes a request to the server for information, the rules of enforcement containing all predefined known conflicts between the associated criteria in different data fields; and
   at least one adjustable interface option displayed on the remote client allowing a user adjustment the associated criteria using the remote client, the user adjustment constrained by the transmitted rules of enforcement such that potential conflicts between the associated criteria during the user adjustment are prevented and automatically corrected to prevent a user from encountering and viewing the conflicts.

18. The display device of claim 17, wherein the at least one adjustable interface option further comprises input boxes for adjusting the associated criteria in real time.

19. The display device of claim 17, wherein the at least one adjustable interface option further comprises input boxes, drop-down menus, check boxes and radio buttons.

20. The display device of claim 17, wherein the at least one adjustable interface option further comprises dynamically coupled check boxes so that designated check boxes dynamically change during the user adjustment.

21. The display device of claim 17, further comprising:
a control module stored on the server, wherein the control module is transmitted from the server to the remote client in response to a request by the remote client;
wherein the at least one adjustable interface option displayed on the remote client communicates with the control module, and wherein the control module facilitates the user adjustment on the remote client.

22. The display device of claim 21, wherein the at least one adjustable interface option further comprises input boxes that are coupled such that the input boxes change in real time during the user adjustment.

23. The display device of claim 22, wherein the at least one adjustable interface option further comprises display markers that are used as indicia of potential sub-item conflicts.

24. The display device of claim 22, wherein the at least one adjustable interface option further comprises activated dialog boxes for displaying during the user adjustment any potential sub-item conflicts, providing suggestions to resolve the conflicts and providing user interaction to resolve the conflicts.

25. A method for enforcing valid combinations of data using a server computer, comprising:
receiving a request for information based on user-defined criteria from a remote computer such that transmitted results are narrowed, limited and targeted to the information;
transmitting results, sub-items associated with the results, and rules of enforcement of sub-item combinations from the server to the remote computer in response to the request, wherein processing of the transmitted results is performed in real time in response to a user adjustment of the transmitted results and sub-items associated with the transmitted results; and
preventing a user of the remote computer from creating, encountering, and viewing conflicts between sub-items in different data fields during the user adjustment of the sub-items by automatically correcting any conflicts using the rules of enforcement such that only sub-items applicable to the user-defined criteria are displayed on the remote computer, the rules of enforcement containing all potential configurable conflicts and predefined known conflicts between the sub-items.

* * * * *